United States Patent
McCown et al.

(10) Patent No.: US 6,708,272 B1
(45) Date of Patent: Mar. 16, 2004

(54) INFORMATION ENCRYPTION SYSTEM AND METHOD

(75) Inventors: Steven H. McCown, Brighton, CO (US); Thai Nguyen, Thornton, CO (US); Michael L. Leonhardt, Longmont, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/315,175

(22) Filed: May 20, 1999

(51) Int. Cl.$^7$ .................... G06F 15/163; G06F 7/04; G06F 15/20
(52) U.S. Cl. ............... 713/151; 713/161; 713/169; 713/171; 713/184; 713/201; 380/30; 380/278; 380/282; 712/25; 712/201; 712/225
(58) Field of Search .................. 713/161, 169, 713/171, 183, 184, 201, 202, 151; 380/278, 282, 30; 712/25, 201, 225

(56) References Cited

U.S. PATENT DOCUMENTS

| | | | |
|---|---|---|---|
| 4,184,200 A | | 1/1980 | Wagner et al. ............. 380/25.5 |
| 4,184,201 A | | 1/1980 | Melberg et al. ............ 380/25.5 |
| 4,262,329 A | * | 4/1981 | Bright et al. ............... 364/200 |
| 4,352,952 A | | 10/1982 | Boone et al. ............... 380/25.5 |
| 4,493,028 A | * | 1/1985 | Heath ......................... 364/200 |
| 4,621,321 A | | 11/1986 | Boebert et al. ............ 380/25.5 |
| 4,701,840 A | | 10/1987 | Boebert et al. ............ 380/25.5 |
| 4,787,027 A | | 11/1988 | Prugh et al. ............... 380/25.5 |
| 4,797,928 A | | 1/1989 | Dykes ....................... 380/25.5 |
| 4,910,776 A | | 3/1990 | Dyke ........................ 380/25.5 |
| 5,063,596 A | | 11/1991 | Dyke ........................ 380/25.5 |
| 5,283,828 A | * | 2/1994 | Saunders et al. ............ 380/4 |
| 5,325,430 A | | 6/1994 | Smyth et al. .............. 380/25.5 |
| 5,495,533 A | * | 2/1996 | Linehan et al. .............. 380/21 |
| 5,560,008 A | | 9/1996 | Johnson et al. ............ 380/25.5 |
| 5,584,023 A | | 12/1996 | Hsu .......................... 380/25.5 |
| 5,615,263 A | * | 3/1997 | Takahashi ..................... 380/4 |
| 5,633,934 A | | 5/1997 | Hember ..................... 380/25.5 |
| 5,684,950 A | | 11/1997 | Dare et al. ................. 380/25.5 |
| 5,742,686 A | | 4/1998 | Finley ....................... 380/25.5 |
| 5,774,546 A | | 6/1998 | Handelman et al. ....... 380/25.5 |
| 5,787,169 A | | 7/1998 | Eldridge et al. ........... 380/25.5 |
| 5,787,175 A | | 7/1998 | Carter ....................... 380/25.5 |
| 5,857,025 A | | 1/1999 | Anderson et al. .......... 380/25.5 |
| 5,878,142 A | | 3/1999 | Caputo et al. ............... 380/25 |
| 5,923,759 A | * | 7/1999 | Lee ............................ 380/25 |
| 5,940,516 A | * | 8/1999 | Mason et al. ................ 380/49 |
| 6,115,816 A | * | 9/2000 | Davis ......................... 713/153 |
| 6,131,090 A | * | 10/2000 | Basso, Jr. et al. ............ 706/23 |

FOREIGN PATENT DOCUMENTS

WO     99 14881     3/1999     ............. 380/180

\* cited by examiner

*Primary Examiner*—Ayaz Sheikh
*Assistant Examiner*—Taghi T. Arani
(74) *Attorney, Agent, or Firm*—Brooks Kushman P.C.

(57) ABSTRACT

An encryption system permits end-to-end encryption of information over an untrusted interconnection network. The information encryption system includes at least one client for processing information. The system also includes at least one storage device for holding the information. At least one key server provides a data key for encrypting and decrypting the information. An encryption module is associated with each client. Each encryption module has a first processor accessing a first memory and a second processor accessing a second memory different from the first memory. The first processor communicates with the associated client. The second processor communicates with the storage device. The first processor communicates with the second processor through a dedicated channel. The second processor obtains the data key from the key server. Information is received from the first processor over the dedicated channel and encrypted using the data key. The encrypted information is then stored on the storage device. The second processor also reads the encrypted information from the storage device, decrypts the information using the data key, and sends the decrypted information to the first processor over the dedicated channel.

9 Claims, 2 Drawing Sheets

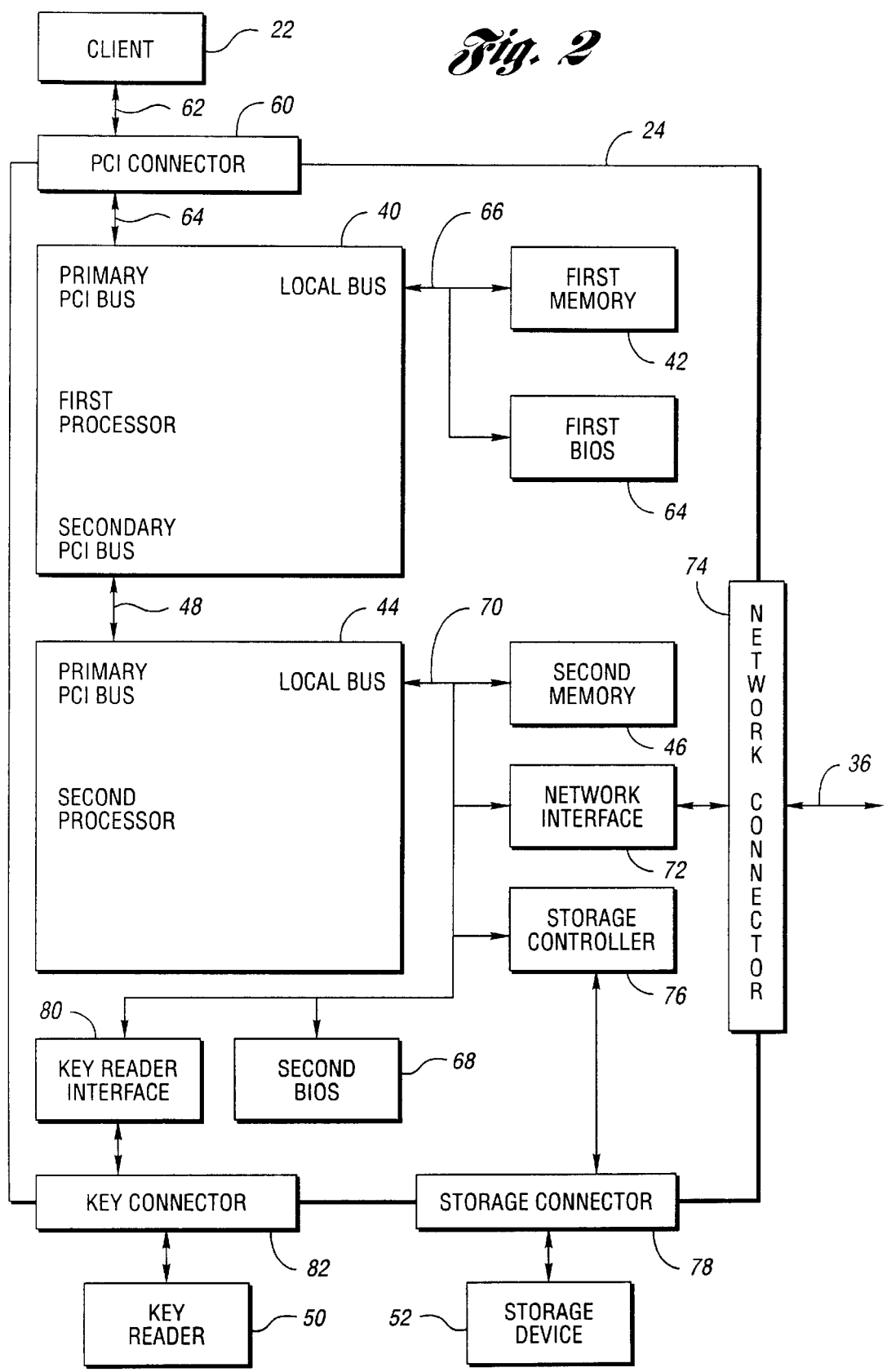

INFORMATION ENCRYPTION SYSTEM AND METHOD

TECHNICAL FIELD

The present invention relates to encrypting information for secure storage.

BACKGROUND ART

Increasingly, information produced by a client must be shared by other clients connected through a computer network. The information may be kept on one or more storage systems also connected to the network. Such networks often interconnect many clients throughout an organization, some of whom are excluded from access to the information. The network may also support connections to public networks, such as the Internet, providing the possibility of unauthorized access from outside of the organization. As such, interconnection networks are often untrusted.

Certain types of information produced and used within an organization must be kept secure. This information includes financial figures, personnel data, health information, business plans, trade secrets, and the like. A client producing such information should be able to read and write this information over an untrusted network. Further, access to this information should be restricted to only those clients with proper authorization.

One method to protect information is to encrypt the information using a key and then transmit the encrypted information over an untrusted network. Two types of encryption may be used, symmetric and asymmetric. In symmetric encryption, the same data key is used to encrypt and decrypt the information. Various types of symmetric encryption which are known in the art include the Data Encryption Standard (DES) algorithm as described in Federal Information Processing Standard Publication 46-1; the Improved DES (IDES) algorithm as described in U.S. Pat. No. 5,214,703 titled "Device For The Conversion Of A Digital Block And Use Of Same"; and the RC-5 algorithm as described in U.S. Pat. Nos. 5,724,428 and 5,835,600 both titled "Block Encryption Algorithm With Data-Dependent Rotations"; each of which is incorporated herein by reference.

In asymmetric encryption, a first key is used to encrypt the information and a second key is used to decrypt the information. Typically, the first key is a public key which may be widely known and the second key is a private key which is known only to authorized clients. Various forms of asymmetric encryption are known in the art, including the Diffie-Hellmean algorithm as described in U.S. Pat. No. 4,200,770 titled "Cryptographic Apparatus And Method"; and U.S. Pat. No. 4,405,829 titled "Cryptographic Communications System And Method"; each of which is incorporated by reference herein.

A technique for sending information over an untrusted network is end-to-end encryption. A host or storage server sends a data key to the client encrypted using a client key which is secret to the host and the client. The client decrypts the data key and holds the data key in a protected region of memory. Data transferred between the host and the client is encoded at one end and decoded at the other end using the data key. The data key is used throughout the entire information access session.

End-to-end encryption has several problems. First, the client key must be known by both the host and the client. Second, because the protected region of memory is part of the client, an imposter client may access protected information. The imposter client may have a stolen client key or may be a client for whom access privileges have been revoked. Third, because the client decrypts the data key and the data, the decrypted data key may be accessible through an attack at the operating system level.

DISCLOSURE OF INVENTION

It is an object of the present invention to separate the client from client-side encryption and decryption.

It is another object of the present invention to permit a client access to information over an untrusted network without permitting the clients to have direct contact with encryption and decryption keys.

Still another object of the present invention is to permit a client to access information over an untrusted network without having the client handle encrypted information.

Yet another object of the present invention is to permit a client to access information over an untrusted network without having the client carry out the encrypting or decrypting process.

A further object of the present invention is to provide secure access to data held on storage devices.

In carrying out the above objects and other objects and features of the present invention, an information encryption system is provided. The information encryption system includes at least one client for processing information. The system also includes at least one storage device for holding the information. At least one key server provides a data key for encrypting and decrypting the information. An encryption module is associated with each client. Each encryption module has a first processor accessing a first memory and a second processor accessing a second memory different from the first memory. The first processor communicates with the associated client. The second processor communicates with the storage device. The first processor communicates with the second processor through a dedicated channel. The second processor obtains the data key from the key server. Information is received from the first processor over the dedicated channel and encrypted using the data key. The encrypted information is then stored on the storage device. The second processor also reads the encrypted information from the storage device, decrypts the information using the data key, and sends the decrypted information to the first processor over the dedicated channel.

In an embodiment of the present invention, each client has a private key and a matching public key such that data encoded with the client public key can only be decoded with the client private key. The client private key may be held by the second processor or may be read by the second processor from a key reader.

In another embodiment of the present invention, the key server receives a request from an encryption module to access encrypted information, the request including the client public key. The key server determines if the associated client has access to the encrypted information. If the client has access, the data key is encrypted using the client public key. The encrypted data key is sent to the requesting encryption module. The second processor receives the encrypted data key and decrypts the encrypted data key with the client private key.

In yet another embodiment of the present invention, the encryption module is a printed circuit card that can be inserted into a card slot in the client processor. In a refinement, the client includes a driver for accessing the encryption module. The driver includes a first logical portion in communication with a second logical portion. The first logical portion provides the client interface to the driver. The second logical portion controls communication with the first processor.

In a further embodiment of the present invention, the second processor functions as the key server.

An information encryption module is also provided. The module includes a first processor in communication with the client. A first memory, accessible by the first processor, holds unencrypted information. A second processor communicates with at least one storage device and a key server. The second processor is connected to the first processor through a dedicated channel. The second processor decrypts the data key and encrypts and decrypts information with the decrypted data key. A second memory, accessible by the second processor, holds encrypted information.

A method is also provided for writing information in an encrypted format to at least one storage device. A data key is obtained. A request is received from the client to store information. Unencrypted information is written to a first memory. The unencrypted information is encrypted using the data key. The encrypted information is written to a second memory not accessible by the client. The encrypted information is sent from the second memory to the storage device.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 2 is a schematic diagram of an encryption module according to an embodiment of the present invention.

BEST MODE FOR CARRYING OUT THE INVENTION

Figure 1:
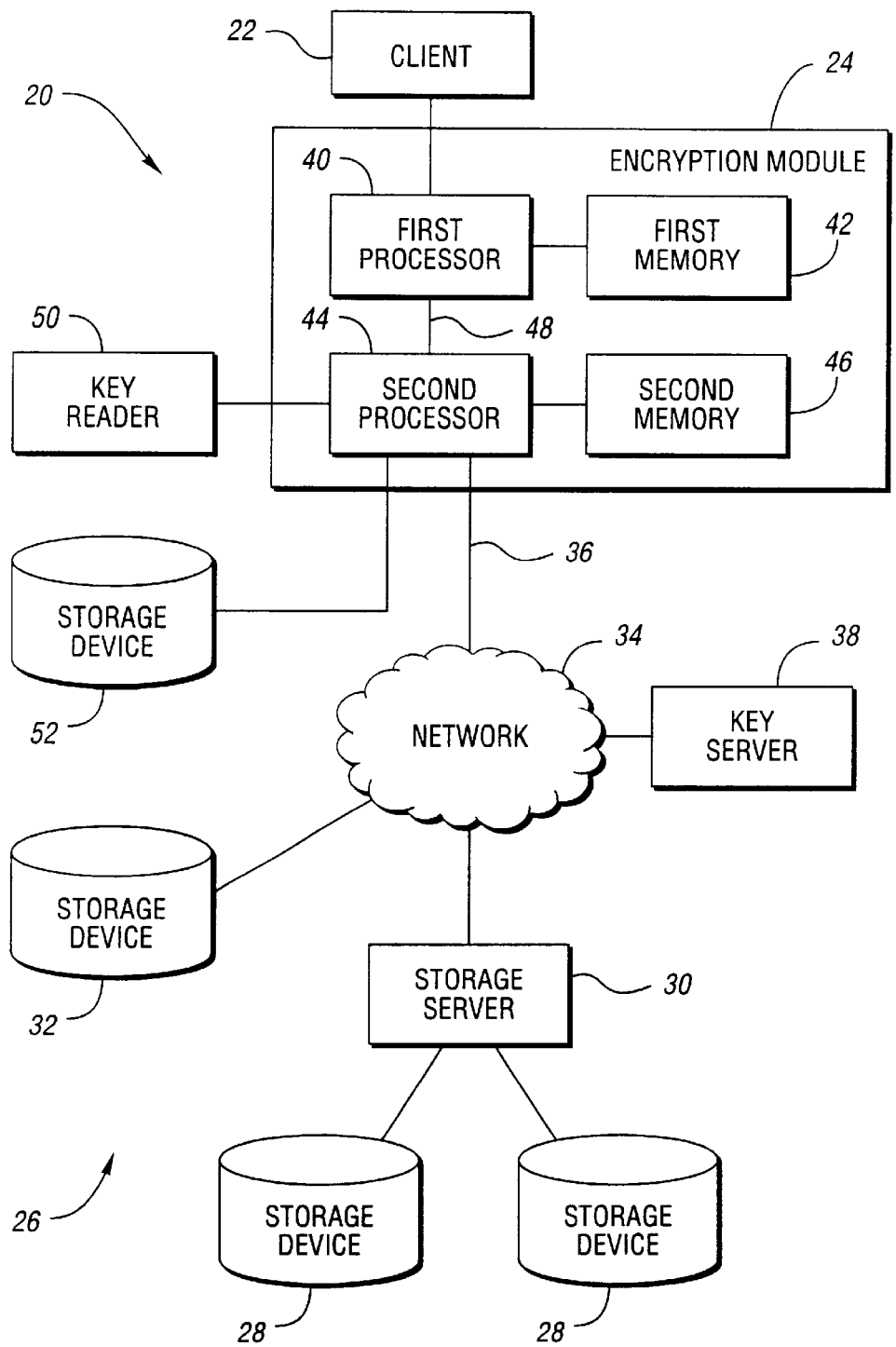
FIG. 1 is a schematic diagram of an encryption system according to an embodiment of the present invention.

Referring to FIG. 1, a schematic diagram of an encryption system according to an embodiment of the present invention is shown. Information encryption system 20 includes at least one client 22 connected through encryption module 24 to at least one storage device. Storage devices may be disks, tapes, drums, integrated circuits, or the like, operative to hold data by any means, including magnetically, electrically, optically, and the like. Storage devices may be arranged in a storage area network, shown generally by 26, which may include storage devices 28 accessed through storage server 30 or directly accessed storage device 32. Storage area network 26 may be part of or may be accessed through interconnection network 34. Encryption module 24 may be connected to interconnection network 34 through network connection 36. Typically, interconnection network 34 is untrusted in that transmissions through interconnection network 34 may be surreptitiously monitored.

Key server 38 may also be connected to network 34. Key server 38 provides data keys for encrypting and decrypting information. Key server 38 may encrypt the data key for transmission over untrusted network 34, as will be described below. In an embodiment of the present invention, one or more storage servers 30 can function as key server 38.

Encryption module 24 includes first processor 40 in communication with client 22. First processor 40 accesses first memory 42. Encryption module 24 also includes second processor 44 in communication with at least one storage device 28,32. Second processor 44 accesses second memory 46. Second memory 46 is separate and distinct from first memory 42. Second memory 46 is not in the memory space of first processor 40, nor is first memory 42 in the memory space of second processor 44. First processor 40 and second processor 44 communicate through dedicated channel 48 using messages. Dedicated channel 48 is the only means through which information passes between first processor 40 and second processor 44.

First processor 40 handles unencrypted information and stores this unencrypted information in first memory 42. Second processor 44 obtains a data key from key server 38. Second processor 44 receives unencrypted information from first processor 40 over dedicated channel 48. Second processor 44 encrypts the information using the data key and stores the encrypted information on at least one storage device 28,32. Second processor 44 can also read encrypted information from at least one storage device 28,32. Second processor 44 decrypts the information using the data key and sends the decrypted information to first processor 40 over dedicated channel 48.

In a preferred embodiment of the present invention, second processor 44 accesses key reader 50. Each user of client 22 is issued an external storage medium device, such as a "smart card", onto which is written a client private key and matching client public key. Second processor 44 reads client private and public keys through key reader 50. When encrypted data is to be sent, either by reading or writing, second processor 44 forwards the client public key to key server 38. When key server 38 receives a request from encryption module 24 to access encrypted information, key server 38 first determines if the associated client 22 has access to the encrypted information. If client 22 has been granted access, key server 38 encrypts the data key with the public key of client 22. The encrypted data key is then sent by key server 38 to encryption module 24. Second processor 44 receives the encrypted data key and decrypts the encrypted data key using the private key for client 22. Second processor 44 can then use the decrypted data key to encrypt information for transmission over interconnection network 34 or decrypt information received through interconnection network 34.

In an embodiment of the present invention, determining access to encrypted information includes several verification checks. Second processor 44 sends an access request to key server 38 including an identification for client 22, the public key for client 22, and an identification for the processor being used by client 22. When key server 38 receives the access request, an Access Control List (ACL) is checked to verify that client 22 is authorized to receive encrypted information. Additionally, the ACL is checked to verify that the processor used by client 22 has the proper security to receive encrypted data.

In an embodiment of the present invention, storage device 52 is directly connected to encryption module 24 through second processor 44. Storage device 52 performs the same functions as storage devices 28,32 described above. Second processor 44 functions in the manner described above to write encrypted information into and read encrypted information from storage device 52. In a refinement, encryption module 24 is not connected to network 34. Second processor 44 is then further operative to perform the functions described for key server 38. A portion of second memory 46 is non-volatile, permitting second processor 44 to store data keys and ACL in a secure location.

Referring now to FIG. 2, a schematic diagram of an encryption module according to an embodiment of the present invention is shown. Encryption module 24 is implemented as a printed circuit card which may be inserted into a computer associated with client 22. PCI connector 60 on encryption module 24 plugs into PCI bus 62 in the client computer system, connecting client system PCI bus 62 with primary PCI bus 64. First processor 40 uses primary PCI bus 64 to communicate with client 22.

First processor 40 communicates with first memory 42 and first BIOS 64 through first local bus 66. Second processor 44 is connected to first processor 40 through dedicated channel 48 implementing a secondary PCI bus. Second memory 46 and second BIOS 68 are connected to second processor 44 through second local bus 70.

Encryption module 24 may include network interface 72 connected to second processor 44 through second local bus 70. Network interface 72 connects to network connection 36 through network connector 74. Network interface 72 and network connector 74 may be adapted to one or more of a wide variety of networks, including local area networks, storage area networks, wide area networks, the Internet, and the like, using a wide variety of interconnection media, such as, for example, twisted pair, coaxial cable, optical fiber, and the like.

Encryption module 24 may also include storage controller 76 connected to second processor 44 through second local bus 70. Storage controller 76 is directly connected to one or more storage devices 52 through storage connector 78. Storage controller 76 and storage connector 78 may be adapted to handle one or more common storage interconnection schemes, including SCSI, Fiber Channel, high speed parallel, and the like. Directly connected storage devices 52 may include one or more of disks, tapes, drums, optical devices, solid-state memory, and the like.

Encryption module 24 may further include key reader interface 80 connected to second processor 44 through second local bus 70. Key reader interface 80 is connected to key reader 50 through key connector 82. In a preferred embodiment, key reader 50 reads a public key and a private key from a "smart card" inserted into key reader 50 for each user of client 22.

In a preferred embodiment, first processor 40 and second processor 44 are each implemented using an i80960 RN I/O processor from Intel Corporation. The i80960 RN processor includes a PCI-to-PCI bridge forming an interconnection path between two independent 64-bit PCI busses. The i80960 RN implementing first processor 40 is configured to hide second processor 44 from client 22. This configuration permits second processor 44 to have an independent and separate memory space. Each i80960 RN processor has an internal memory controller unit permitting devices connected to local bus 66,70 to appear in the private processor memory space of respective processor 40,44. First memory 42 and second memory 46 are implemented with 72-bit wide SDRAM modules including error detection and correction capabilities.

In an embodiment of the present invention, encryption module 24 is built to an open system standard. Client 22 includes a driver for accessing encryption module 24. The driver includes a first logical portion in communication with a second logical portion. The first logical portion provides client 22 with an interface to the driver. The second logical portion controls communication with first processor 40.

While embodiments of the invention have been illustrated and described, it is not intended that these embodiments illustrate and describe all possible forms of the invention. Rather, the words used are words of description rather than limitation, and it is understood that various changes may be made without departing from the spirit and scope of the invention.

What is claimed is:

1. An encryption module connecting a client with at least one storage device, the encryption module in communication with a key server operative to provide an encrypted data key for encrypting and decrypting information stored on the at least one storage device, the encryption module comprising:

a first processor in communication with the client through a computer bus internal within the client;

a first memory accessible by the first processor, the first memory operative to hold unencrypted information;

a second processor in communication with the at least one storage device and the key server, the second processor connected to the first processor through a dedicated channel, the second processor operative to decrypt the data key and to encrypt information and decrypt information with the decrypted data key; and a second memory accessible by the second processor, the second memory separate from the first memory, the second memory operative to hold encrypted information.

2. An encryption module as in claim 1 wherein the first processor is operative to:

receive information for encryption from the client;

store unencrypted information in the first memory;

send data for encryption to the second processor through the dedicated channel;

receive decrypted information from the second processor; and send decrypted information to the client.

3. An encryption module as in claim 1 wherein the second processor is further operative to:

read a client public key and a matching client private key;

send the client public key to the key server;

receive as the encrypted data key from the key server a data key encrypted using the client public key; and decrypt the data key using the client private key.

4. An encryption module as in claim 3 further comprising a reader in communication with the second processor, the reader operative to permit the second processor to read the client public key and the client private key from an external storage medium.

5. An encryption module as in claim 3 wherein the second processor is further operative to:

receive information for encryption from the first processor through the dedicated channel;

encrypt the information using the decrypted data key; and store the encrypted information on the at least one storage device.

6. An encryption module as in claim 3 wherein the second processor is further operative to:

receive a request from the first processor to read encrypted information;

read encrypted information from the at least one storage device;

decrypt the encrypted information using the decrypted data key; and send the decrypted information to the first computer through the dedicated channel.

7. An encryption module as in claim 1 wherein the second processor is further operative to provide an encrypted data key for encrypting and decrypting information.

8. An encryption module connecting a client with at least one storage device, the encryption module in communication with a key server operative to provide an encrypted data key for encrypting and decrypting information stored on the at least one storage device, the encryption module comprising:

a first processor in communication with the client;

a first memory accessible by the first processor, the first memory operative to hold unencrypted information;

a second processor in communication with the at least one storage device and the key server, the second processor connected to the first processor through a dedicated channel, the second processor operative to decrypt the data key and to encrypt information and decrypt information with the decrypted data key; and a second memory accessible by the second processor, the second memory separate from the first memory, the second memory operative to hold encrypted information;

wherein the second processor is further operative to:

receive information for encryption from the first processor through the dedicated channel;

encrypt the information using the decrypted data key; and store the encrypted information on the at least one storage device.

9. An encryption module connecting a client with at least one storage device, the encryption module in communication with a key server operative to provide an encrypted data key for encrypting and decrypting information stored on the at least one storage device, the encryption module comprising:

a first processor in communication with the client;

a first memory accessible by the first processor, the first memory operative to hold unencrypted information;

a second processor in communication with the at least one storage device and the key server, the second processor connected to the first processor through a dedicated channel, the second processor operative to decrypt the data key and to encrypt information and decrypt information with the decrypted data key; and a second memory accessible by the second processor, the second memory separate from the first memory, the second memory operative to hold encrypted information;

wherein the second processor is further operative to:

receive a request from the first processor to read encrypted information;

read encrypted information from the at least one storage device;

decrypt the encrypted information using the decrypted data key; and send the decrypted information to the first processor through the dedicated channel.

* * * * *